United States Patent [19]

Tatsumi et al.

[11] Patent Number: 4,843,461
[45] Date of Patent: Jun. 27, 1989

[54] OVER-DOOR INTERPHONE SYSTEM PROVIDED WITH A NIGHT-VISION MONITORING DEVICE

[75] Inventors: Yoshikazu Tatsumi; Tsuyoshi Hisano, both of Hirakata, Japan

[73] Assignee: Matsushita Electric Works, Ltd., Osaka, Japan

[21] Appl. No.: 26,368

[22] PCT Filed: Jun. 25, 1986

[86] PCT No.: PCT/JP86/00323
§ 371 Date: Feb. 6, 1987
§ 102(e) Date: Feb. 6, 1987

[87] PCT Pub. No.: WO87/00384
PCT Pub. Date: Jan. 15, 1987

[30] Foreign Application Priority Data

Jun. 25, 1985 [JP] Japan ................. 60-138557
Aug. 14, 1985 [JP] Japan ................. 60-178850
Aug. 14, 1985 [JP] Japan ................. 60-178851
Aug. 14, 1985 [JP] Japan ................. 60-178852

[51] Int. Cl.$^4$ ............ H04N 7/18; H04N 7/14; H04N 5/33
[52] U.S. Cl. ................. 358/108; 358/113; 358/85; 379/53
[58] Field of Search ........... 358/108, 113, 229, 85; 379/53, 54

[56] References Cited

U.S. PATENT DOCUMENTS

| | | | |
|---|---|---|---|
| 3,482,037 | 12/1969 | Brown et al. | 358/108 |
| 3,612,764 | 10/1971 | Gilkeson | 358/108 |
| 3,816,654 | 6/1974 | Brighman | 358/108 |
| 3,891,795 | 6/1975 | Johnson et al. | 358/225 |
| 4,232,196 | 11/1980 | Flippi | 358/108 |
| 4,355,329 | 10/1982 | Yoshida et al. | 358/108 |
| 4,370,675 | 11/1983 | Cohn | 358/108 |
| 4,524,384 | 6/1985 | Lefkowitz et al. | 358/108 |

FOREIGN PATENT DOCUMENTS

47-31210 12/1972 Japan.
56-39782 4/1981 Japan.
59-146284 8/1984 Japan.
59-204392 11/1984 Japan.
60-69995 4/1985 Japan.

Primary Examiner—James J. Groody
Assistant Examiner—John K. Peng
Attorney, Agent, or Firm—Armstrong, Nikaido, Marmelstein & Kubovcik

[57] ABSTRACT

An over-door interphone system for telephonic communication between a master station unit inside of a house and a remote station unit outside of an entrance door of the house is provided with a night-vision monitoring device. The night-vision monitoring device has a television camera comprising a solid-state camera sensitive to an infrared light. The solid-state camera is responsible for successfully incorporating the television camera within a less bulky housing of the remote station unit as well as for monitoring the image of a visitor by the camera without being noticed. Also, there can be utilized an illumination device producing an infrared which is hardly perceived by the visitor, ensuring monitoring of the visitor at night without a giving unfavorable impression thereto. The illumination device may be driven to operate for a predetermined period of time starting from the actuation of a calling switch, or a communication interval from the actuation of the calling switch to the hangup of a handset on the master station unit. The illumination device may be also driven in response to the actuation of an illumination operating switch or to a low illuminance level of the object. Thus, the illumination device can be operated with a minimum power requirement. The illumination device is controlled to operate in synchronous with the video signal from the television camera, providing an effective monitoring illumination free from flicker.

12 Claims, 9 Drawing Sheets

OVER-DOOR INTERPHONE SYSTEM PROVIDED WITH A NIGHT-VISION MONITORING DEVICE

TECHNICAL FIELD

The present invention is directed to an over-door interphone system for a telephonic intercommunication between inside and outside of a house, and more particularly to an over-door interphone system provided with a night-vision monitoring device.

BACKGROUND ART

It is well known that a conventional interphone system includes a master station inside a house and a remote station installed at an entrance of the house. The stations are electrically connected for a telephonic intercommunication between a visitor and an occupant of the house upon operation of a system actuation switch provided at the remote station. However, this interphone system, has often been unsatisfactory for the house occupant to surely indentify the visitor, because the personal identification is made only through the telephonic or verbal intercommunication.

For elimination of the above problem, there has been an attempt made to annex a video monitor subsystem to a conventional telephonic intercommunication system as shown in FIG. 1 to obtain a more ensured identification of the visitor with the aid of visual information. The conventional video monitor subsystem includes a tube type television camera 4 such as a vidicon installed near the remote station at the entrance for picking up the facial image of the visitor and a video monitor display installed at the master station for displaying the image thereon to provide a helpful visual information for the house occupant. The above system, however, has been problematic for the reason that the television camera 4 tends to give an offensive impression to the visitor with its relatively bulky and conspicuous appearance. It has of course been tried to integrate the vidicon type television camera 4 into the housing of the remote station 1 for alleviation of such an unfavorable factor, which conversely leads to another problem that the vidicon type television camera 4 requires renewal every certain period due to burning of the image plate thereof. The vidicon type television camera 4 integrated into the housing of the remote station brings about the further problem that it necessitates a control circuit provided close thereto controlling the convergence of the electron beam and so forth, which inevitably ends in the increase in size of the housing of the remote station. More precisely as shown in FIG. 2, the vidicon type television camera 4 occupies a considerable amount of the total internal space of the housing 6 of the remote station 1 even with respect to an audio unit U and requires an optical opening of a relatively large size, which again ends in bulky and conspicuous appearance of the remote station 1 giving an unfavorable impression to the visitor.

In addition, the vidicon type television camera 4 being innately designed to be sensitive only to visible daylight is generally operated at night with the assistance of an illumination device to obtain an image of a sufficient brightness, which may induce a far more repugnance of the visitor thereaganist with a feeling of being subjected to severe observation. Such an illumination device 44 has been conventionally mounted or integrated with the television camera 4 within the remote station installed at the entrance as shown in FIG. 2, where the illumination device 44 occupies a greater amount of space to provide light of a sufficient illuminance, which also ends in the dimensional increase of the remote station marring the appearance around the entrance of the house.

Although it is expedient to adopt an image orthicon sensitive to an infrared light for the television camera 4 to overcome the above problem, the adoption of the image orthicon still accompanies the dimensional increase of the remote station as well as the same drawbacks inherent to the vidicon with a practically prohibitive cost for use by the general public.

There is a color camera device sensitive to light of relatively low illuminance as disclosed in the unexamined Japanese Utility Model Publication No. 55-166617. However, such a color camera device is unbenefitting for the interphone of home use because it employs an instrument generally referred to as the image intensifier being which is too large and expensive.

In consideration of the above-mentioned problems, the present invention is made to provide an interphone system with an improved video monitor subsystem.

DISCLOSURE OF THE INVENTION

An oven-door interphone system provided with a night vision monitoring device in accordance with a first form of the present invention includes a master station unit located inside of a house and a remote station unit located outside of an entrance door of the house. The station, units are connected for telecommunication between a visitor and a dweller. The remote station unit includes a housing and a television camera which is mounted within the housing to comprise an optical unit including a solid state camera sensitive to infrared light and optical lens means device disposed in front thereof. Also included in the remote station unit are a control circuit device mounted adjacent to the optical unit for controlling the same, a call switch device within the housing for calling the master station unit, and a telecommunication device within the housing for telephonic intercommunication betweeen the master and remote station units. The master station unit comprises a video display for monitoring the image of the visitor picked up by the televison camera. Since the solid state camera is sensitive to infrared light as well as to visible light, it is capable of obtaining a video signal for a visitor so as to monitor the video image thereof on the video display of the master station unit even at night without being noticed by the visitor. The solid state camera eliminates a particular control circuit for converging the electron beam which is indispensable in the conventional camera tubes and makes it possible to be disposed away from a control circuit for processing the scan and video signals thereof. Further, since the solid state camera defines its target site on its element surface, the distance between the optical lens device and the target site of the solid camera can be reduced while the target site area is kept relatively small. All of the above contribute to the realization of a small-sized television camera of reduced depth which is readily incorporated in the housing of the remote station unit and particularly suitable for the over-door interphone system.

In the night-vision monitoring device for the over-door interphone system in accordance with the first form of the present invention, the television camera is composed of the optical unit having the solid state camera sensitive to infrared light and the optical lens device placed in front thereof and of the control circuit device disposed around the optical unit. This enables the use of a small sized optical unit as well as enabels the control circuit device to be disposed separately from the optical lens device and the solid state camera. This allows the television camera to be made compact in size so that the camera can be successfully incorporated within the housing of the remote station unit which is of a relatively small size and of an appearance closer to the conventional remote station unit. Thus, it is possible to pick up the image of the visitor for monitoring the same on the display of the master station unit without giving an obtrusive impression to the visitor. Further, the picking up of the visitor's image can be made even at night without being noticed by the visitor with the aid of the infrared light to which the solid state camera is sensitive.

Another advantageous feature disclosed in the first form of the present invention is that the the television camera can capture the facial image of the visitor who comes close to the remote station unit with visitor's hand manipulating the pushbutton on the front of the housing of the unit for successfully identifying the visitor. To this end, the viewing range of the television camera is set so as to cover the face and its vicinity of the visitor who is in a position with a hand extending onto the pushbuttom of the call switch device for manipulation thereof, whereby the television camera can pick up the facial image of the visitor for identification on the video display.

A second form of the present invention discloses an infrared light emitting illumination device added to the construction of the first form of the present invention for an illumination purpose. The infrared light emitting illumination device is mounted on the side of the remote station unit and produces the invisible infrared light, enabling night-vision monitoring without being noticed by the visitor.

With the provision of the infrared light emitting illumination device, the second form of the present invention is capable of producing the infrared light for illuminating the visitor at night without being noticed thereby so as to successfully pick up the image of the visitor at night without suffering from illumination deficiency by better utilization of the characteristic of the solid state camera being sensitive to the infrared light.

Another advantageous feature of the second form of the present invention is to provide an effective illumination and prevent the illumination from being totally inoperative in case of possible failure occurring in a particular illumination circuit thereof. To this end, there are utilized as the infrared light emitting illumination device a plurality of infrared light emitting diodes which are divided into a plurality of groups in each of which the idodes are series connected. The groups of the diodes are connected in parallel circuit relation to the output of an illumination control device so as to produce the light efficiently with a number of the series connected diodes as well as to protect against total illumination failure even if one of the diodes is broken down, ensuring the constant and stable monitoring of the visitor.

A further advantageous feature of the second form of the invention is to control the illuminating operation of the infrared light emitting illumination device in proportion to the environmental illumination level. To this end, there is employed an illumination control device for controlling the infrared light emitting illumination device. The illumination control device is arranged to provide an output for driving the infrared light emitting illumination device when it determines based upon the video signal from the television camera that the illumination level of the object to the monitored is lower than a predetermined level. With this arrangement, the television camera can be best utilized to sense the environment illumination level, enabling the illumination control device to be made simple and at a low cost, yet assuring optimum illumination control based upon the video signal from the television camera.

A still further advantageous feature of the second form of the present invention is to intermittently drive the infrared light emitting illumination device in synchronism with the video signal from the television camera when the sensed environment illumination level around the remote station unit is determined to be lower than a predetermined level. To this end, the illumination control circuit is so arranged as to intermittently drive the infrared light emitting illumination device in synchronism with the video signal from the television camera when the sensed environmental illumination level around the remote station unit is below the predetermined level, enabling the infrared light emitting illumination device to be driven only when there is an insufficient illumination level for the television camera, yet reducing the power requirement with this intermittent driving operation.

A further advantageous feature of the second form of the present invention is to make the infrared light emitting illumination device unnoticeable by the visitor as well as to facilitate the installation and handling thereof. For this purpose, the infrared light emitting illumination device is incorporated within the housing of the remote station unit such that the infrared light emitting illumination device is concealed within the housing from the eyes of the visitor as well as that it is held in position simultaneously with the installation of the remote station unit.

The other feature of the second form is that the installation place of the infrared light emitting illumination device can be arbitrarily determined with respect to that of the remote station unit. For obtainment of this effect, the present form adopts the construction that the infrared light emitting illumination device is designed to be mountable on a joinder device electrically and mechanically connected to the remote station unit in a detachable manner. With this construction the infrared light emitting illumination device can be detached from the jointed device when the environmental illuminance is sufficient by virtue of another night illumination device such as a street lamp or a porch lamp. The infrared light emitting illumination device is used as being mounted on the joinder device when no other illumination device is available thereabout. Thus in either case a safe and secured pickup of the image of the visitor at night can be attained without being noticed by the visitor.

A third form of the present invention has its basic construction as discussed on the second form, and further includes an illumination control device for controlling the infrared light emitting illumination device for a predetermined period from the operation of the call switch device provided at the remote station unit. The illumination control means device to operate the infrared light emitting illumination device upon the operation of the call switch device by the visitor for the predetermined period to achieve an ensured image pickup at night where the environmental illumunance is insufficient.

The third form of the above construction has the effect of operating the infrared light emitting illumination device automatically upon the operation of call switch device by the visitor having no connection with the master station unit while eliminating useless consumption of the electric power.

A fourth form of the present invention has its basic construction as discussed on the second form and further includes an illumination operator device on the side of the master station unit. The illumination operator means is operated by the house occupant through monitoring the face image of the visitor.

The fourth form of the above construction has the effect that the illumination can be controlled on the side of the master station unit by the house occupant in accordance with the environmental illuminance level around the remote station unit, the presence of a reflection light and so forth to obtain an ensured image pickup with the television camera.

Another feature of the fourth form of the present invention is that the operation of the infrared light emitting illumination device is continued until the hand set of the master station is restored or put back to the hang-up position thereof. For establishment of this construction an illumination operator device is provided on the side of the master station unit, by which the infrared light emitting illumination device is made to be operated from the actuation of call switch device to the restoration of the hand set of the master station unit. Adoption of this construction enables an automatic operation of the infrared light emitting illumination device in connection with the call switch device and the hand set to facilitate the operation of the interphone system. In consequence the switching of the power of the infrared light emitting illumination device can be well managed without fail to curtail wasteful power consumption.

PREFERRED EMBODIMENTS FOR CARRYING OUT THE PRESENT INVENTION.

The following discusses several embodiments of the present invention in detail based on the drawings.

EMBODIMENT 1

Figure 1:
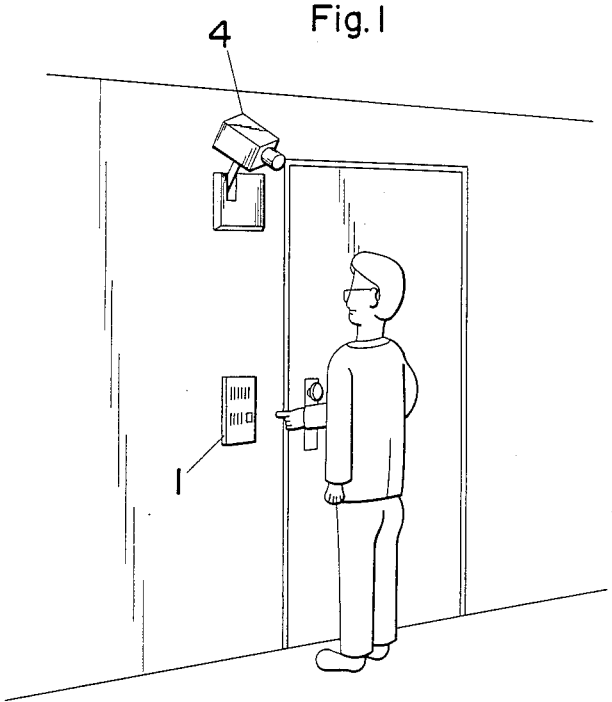
FIG. 1 is a perspective view of a conventional remote station unit a television camera shown in its installed condition.
Figure 2:
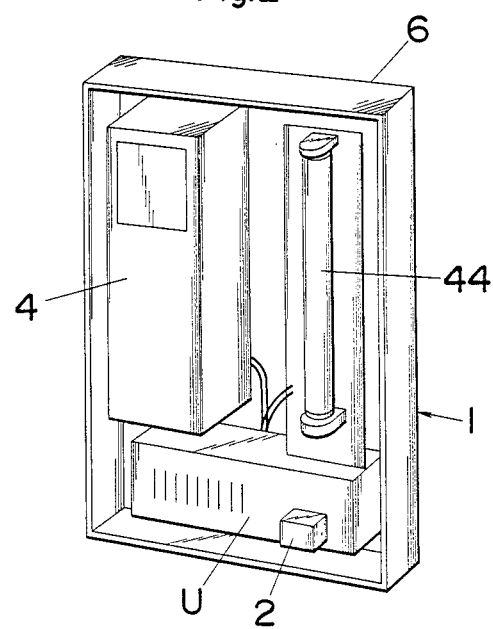
FIG. 2 is a perspective view of another conventional remote station unit with an incorporated television camera shown with a cover being removed.
Figure 3:
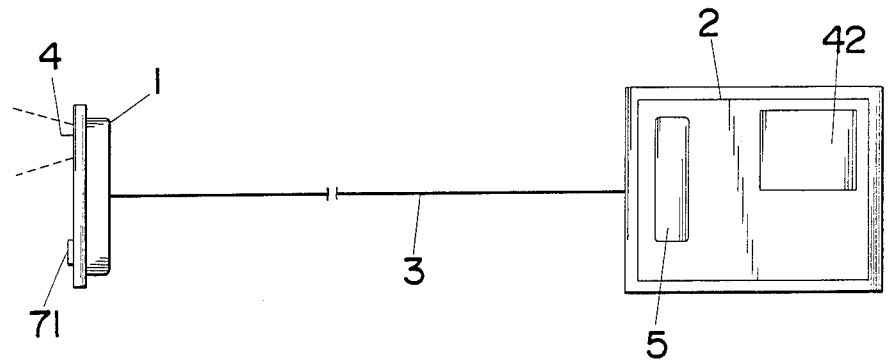
FIG. 3 is a schematic diagram of an over-door interphone system provided with a night-vision monitoring device in accordance with the first embodiment of the present invention.

An over-door interphone system in accordance with the first embodiment of the present invention comprises a remote station unit 1 installed at an entrance of a house, a master station unit 2 installed inside the house and a signal transmission line 3 comprising an audio signal line and a video signal line connecting the remote station unit 1 and the master station unit 2 as shown in FIG. 3. The master station unit 2 comprises a video display 42 on which an object image obtained from a television camera 4 mounted in the remote station unit 1 is displayed and a hand set 5 for telecommunication with the remote station unit 1.

Figure 4:
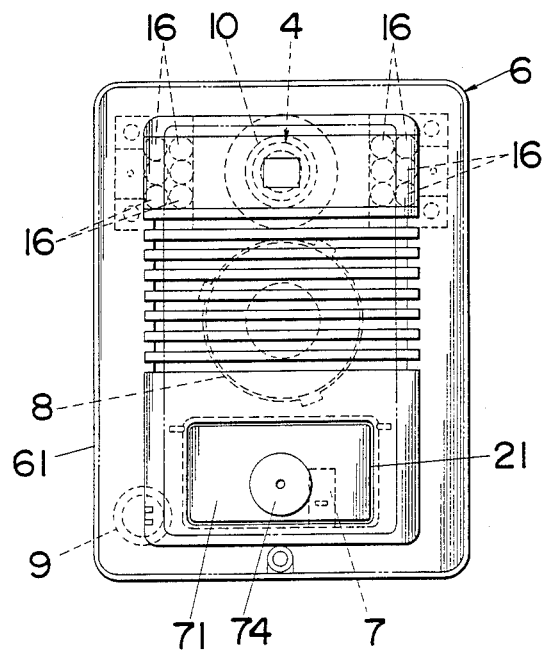
FIG. 4 is a front view of a remote station unit employed in the first embodiment.
Figure 5:
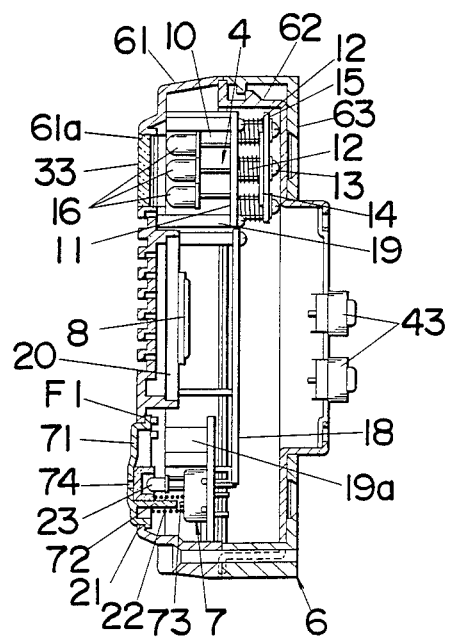
FIG. 5 is a side sectional view of the remote station unit of the first embodiment.
Figure 6:
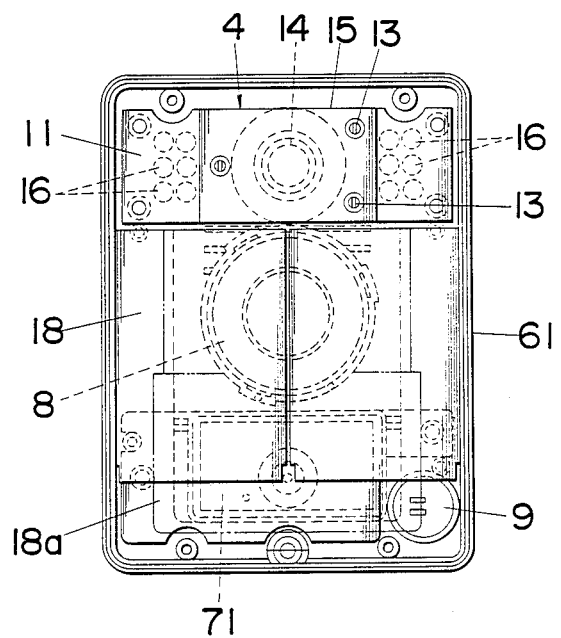
FIG. 6 is a rear view of the remote station unit of the first embodiment with its base removed.
Figure 7:
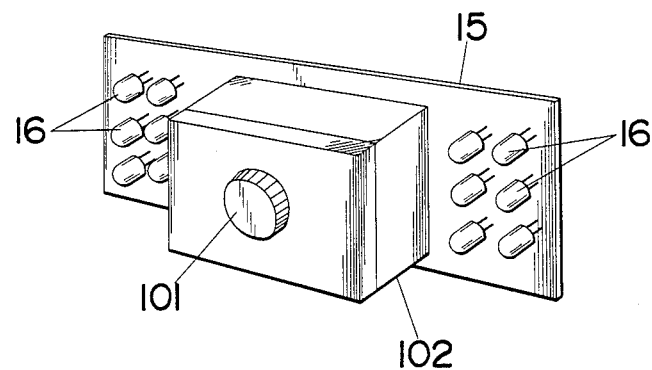
FIG. 7 is a perspective view of a printed board and infrared light emitting diodes mounted thereon employed in the first embodiment of the present invention.
Figure 8:
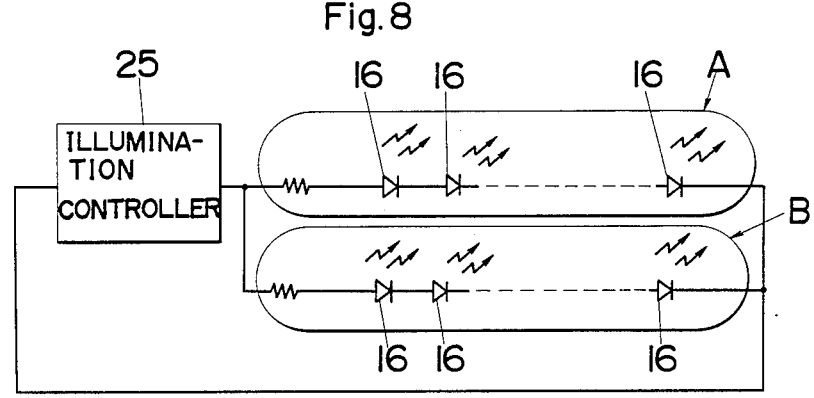
FIG. 8 is a circuit diagram showing the connection of the infrared light emitting diodes of the first embodiment.

The remote station unit 1 includes a television camera 4, a call switch 7, a speaker 8, a microphone 9 necessary for the telecommunication means and so forth in a housing 6 thereof as shown in FIGS. 4 to 6. The housing 6 consists of a cover 61, a chassis 62 and a base 63. The base 63 is provided with terminals 43 to which the signal transmission line 3 and a power supply line are connected. The television camera 4 is composed of an optical unit 10 which is coupled to a printed board 15 carrying thereon solid state camera 14 of CCD or MOS type by means of coil springs 12 and screws 13 passing therethrough. The coil springs 12 are provided to hold the optical unit 10 and the solid state camera 14 mounted on the printed board 15 in a suitable distance, whereby an object image is focused on the photosensitive target site of the solid state camera 14 through an optical lens means 101 of the optical unit 10. As shown in FIG. 7, the optical unit 10 includes a printed 11 mounting centrally thereof a casing 102 covers the solid state camera 14 on the printed board 15, and includes the optical lens means 101 received in the front opening of the casing 102. A light entering through the optical lens means 101 will pass inside of the casing 102 and through an opening (not shown) formed in the printed board 11 to be focused on the target site of the solid state camera 14 on the printed board 15. A display controller 34 for the television camera 4 including the optical unit 10 and the solid state camera 14 is formed on a printed board 18 mounted at a location sideward of the optical unit 10 and behind the speaker 8 for arranging the television camera 4 to have a reduced thickness. On either side of the casing 102 there are formed a suitable number of infrared light emitting diodes 16 producing infrared light for an illumination purpose. These infrared light emitting diodes 16 are preferably divided into groups A and B located respectively on both sides of the casing 102 with the infrared light emitting diodes 16 being series connected in each group. As shown in FIG. 8, the infrared light emitting diodes 16 forming the groups A and B are connected in parallel relation to an illumination controller 25 such that one circuit of the diode groups will operate to produce enough amount of illumination even if the other fails, providing safeguard against total illumination failure. An infrared light transmissive filter 33 is provided in an opening 61a of the cover 61 located in front of the optical unit 10 and the infrared light emitting diodes 16 in order to conceal the television camera 4 as well as the infrared light emitting diodes 16 from the eyes of the visitor.

Figure 9:
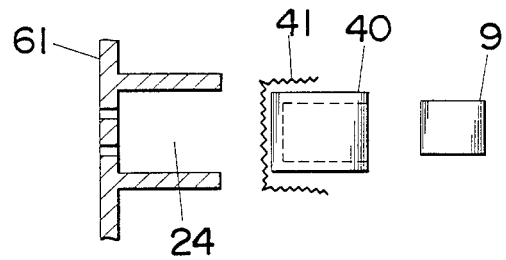
FIG. 9 is a schematic view of a microphone and its associated parts employed in the first embodiment.

The printed board 18 carrier the illumination controller 25 other than the display controller 34, while a printed board 18a beside the printed board 18 carries the call switch 7 for actuating the interphone system, the printed boards 18 and 18a being fixed to bosses 19 and 19a provided on the interior of the cover 61. A pushbutton 71 for the call switch 7 is urged by means of a coil spring 22 to project outwardly through a window 21 in the cover 61, the coil spring 22 being wound around a rib 72 projecting on the rear the pushbotton 71 and compressed between the enclosure of the call switch 7 and the pushbotton 71. When the pushbotton 71 is pressed against the bias of the coil spring 22, it pivots about an axis F1 to push an actuator button 73 of the call switch 7 at the end of the rib 72, actuating the call switch 7. On the other hand, there is provided in the center of the pushbotton 71 a window 74 for passing therethrough ligh emitted from a position indicating light emitting diode 23 provided on the printed board 18. The speaker 8 for outputting a verbal message from the master station unit 2 is heat-welded to the cover 61 through a water-tight packing 20 while a microphone 9 for dispatching a verbal message from the remote station unit 1 is put in a rubber case 40 which is received in a cavity 24 of the cover 61 with a waterproof packing 41 interposed therebetween as shown in FIG. 9.

Figure 10:
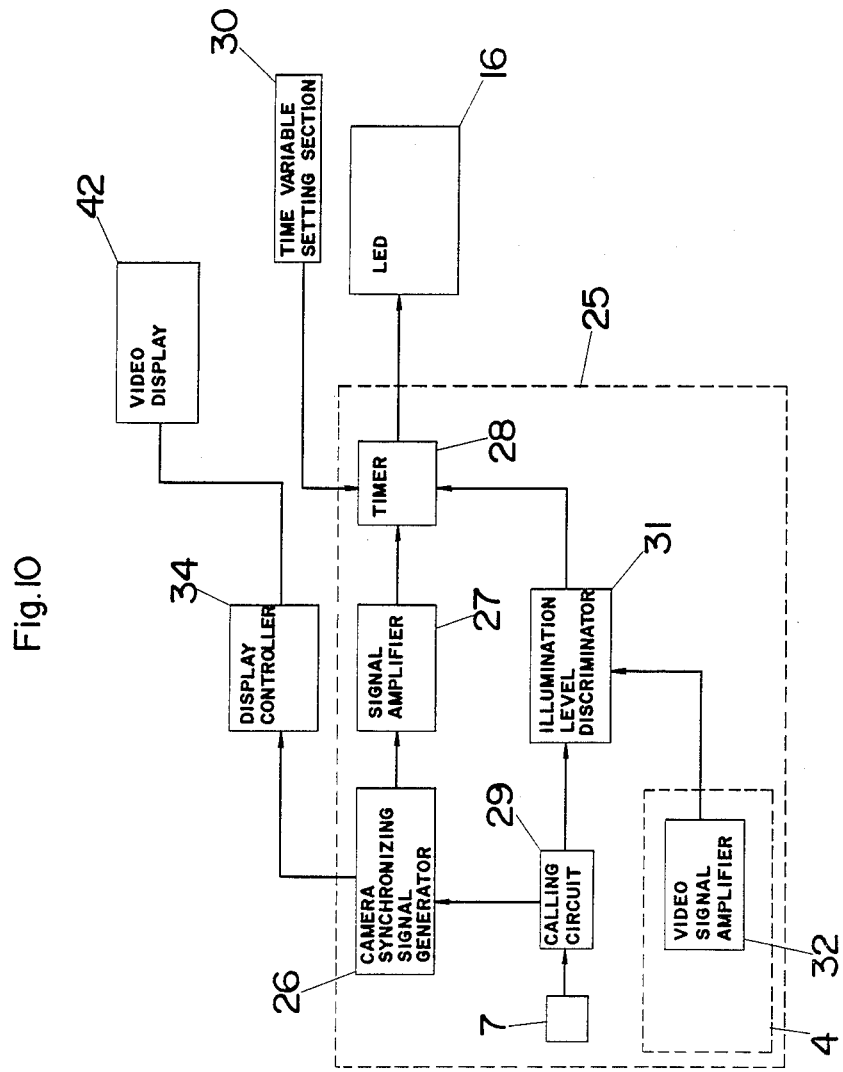
FIG. 10 is a block diagram of an illumination controller employed in the first embodiment.

The infrared light emitting diodes 16 are controlled by the illumination controller 25. The illumination controller 25 has a circuit configuration, as shown in FIG. 10 that a synchronizing signal from a camera synchronizing signal generator 26 is amplified in a signal amplifier 27 and then output to drive the infrared light emitting diodes 16 for a predetermined period set up in a timer 28. The infrared light emitting diodes 16 are driven to ensure a sufficient illuminance level in an intermittent manner generating no flicker under the control of the synchronizing signal in a synchronous relation with the input of a trigger signal from a calling circuit 29 in response to the call switch 7 for a predetermined period set up in a time variable setting section 30 provided at the master station unit 2. The trigger signal to the timer 28 is rendered valid only when the latter receives from an illumination level discriminator 31 a signal indicative of insufficient environmental illumination level (which signal is referred to as a "dark signal" hereinafter). The illumination level discriminator 31 produces the dark signal when it determines based upon a video signal from a video signal amplifier 32 of the television camera 4 whether the illuminance of the object image (facial image of the visitor) ia lower than a predetermined level.

In this end, when the visitor operates the pushbotton 71 to actuate the call switch 7, a telecommunication circuit is set on operation to start calling and communicating in the same manner as in the conventional overdoor interphone system, and simultaneously the timer 28 acts to initiate the illumination by the infrared light emitting diodes 16 for the predetermined period of time when the illumination level discriminator 31 determines that there is insufficient illuminance level.

When a visitor pushes the pushbotton 71 to actuate the call switch 7, the telecommunication circuit is ready for calling and communication operations. At this occurrence, the calling circuit 29 activates the camera synchronizing signal generator 26 which responds to drive the display controller 34 of the television camera 4 and the video display 42 of the master station unit 2, and to drive the infrared light emitting diodes 16 for intermittently producing the light and simultaneously provides the trigger signal to the timer 28. Upon this consequence, the illumination level discriminator 31 determines the illuminance level of the face of the visitor based upon the level of the output signal from the video signal amplifier 32 of the television camera 4 so that it produces the dark signal when the illumination level is determined to be lower than a predetermined minimum level for satisfactory monitoring, allowing the trigger signal to be fed to the timer 28. When there is a sufficient illumination level, the dark signal is not produced so as to disable the trigger signal to be fed to the timer 28. Accordingly, the infrared light emitting diodes 16 can be driven for a predetermined period of time determined by the timer 28 only when the pushbotton 71 is pressed and the illumination level is determined to be insufficient based upon the output of the television camera 4. It is noted at this time the television camera 4 has a viewing range such that it has a focus on the face of the visitor who is in a position with a hand extending onto the pushbotton 71 for manipulation thereof, ensuring satisfactory monitoring of the facial image of the visitor with a sufficient illumination.

EMBODIMENT 2

Figure 11:
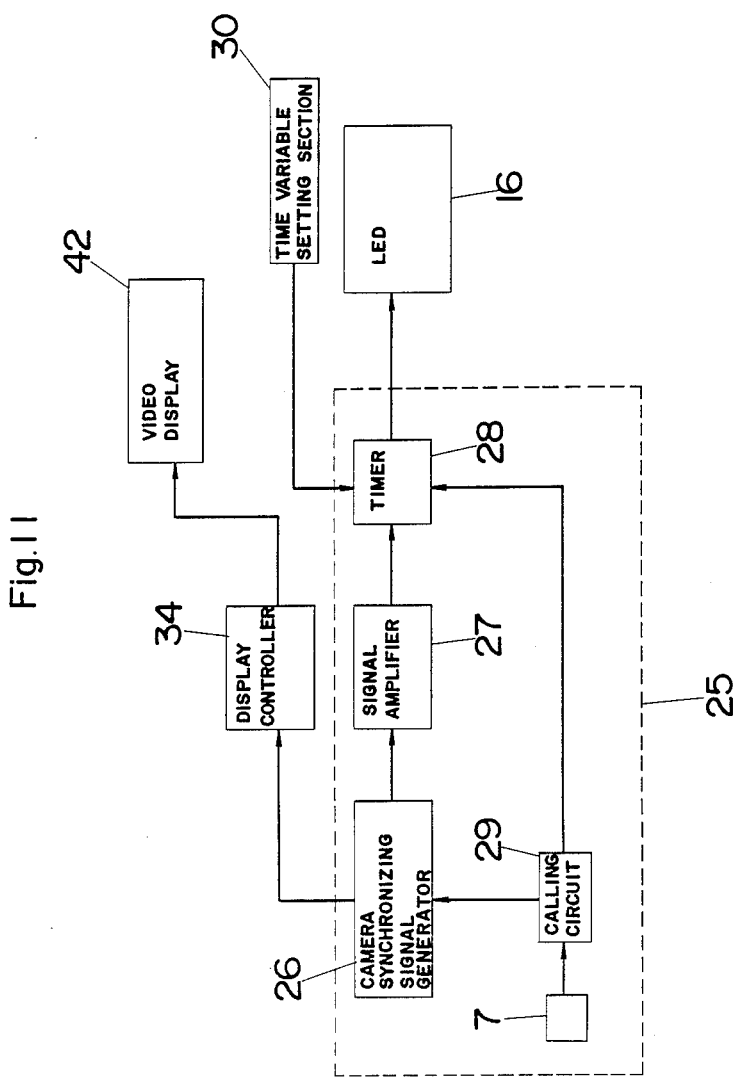
FIG. 11 is a block diagram of an illumination controlled employed in a second embodiment of the present invention.

As shown in FIG. 11, the present embodiment contemplates that the timer 28 is always actuated by the trigger signal from the calling circuit 29 to produce the light for a predetermined period of time starting from the actuation of the call switch 7, irrespective of the illumination level of the object image, in contrast to the above first embodiment in which the illumination controller 25 is arranged to include the video signal amplifier 32 and the illumination level discriminator 31 for defining the trigger signal from the calling circuit 29 as a valid signal for driving the timer 29 only when the illumination level of the object image is below the predetermined level.

EMBODIMENT 3

Figure 12:
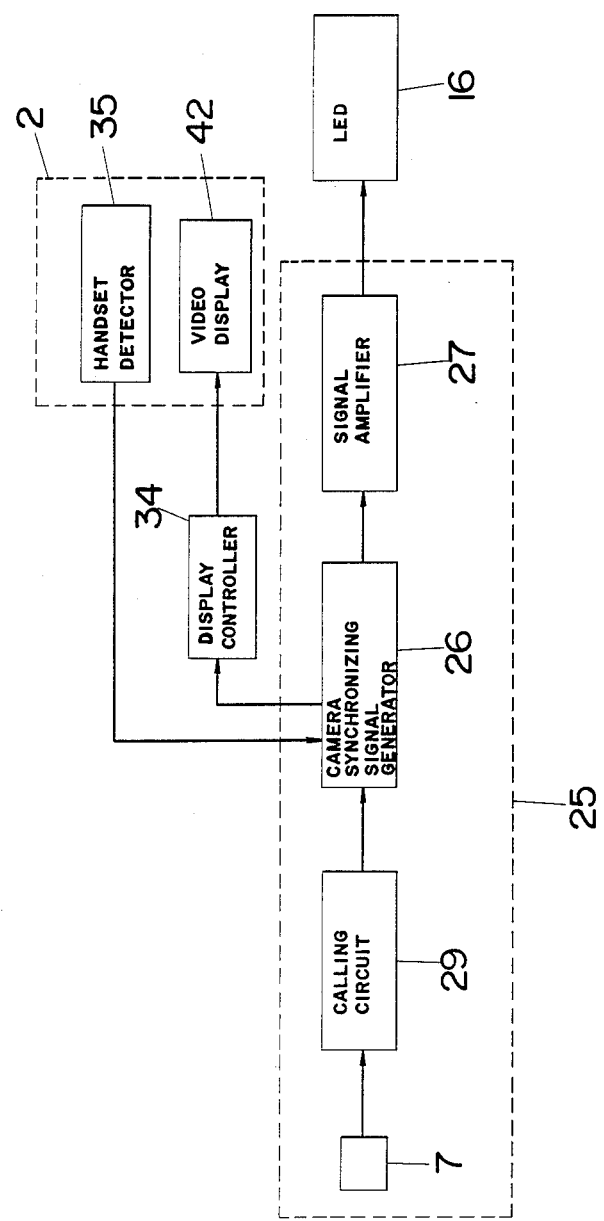
FIG. 12 is a block diagram of an illumination controller employed in a third embodiment of the present invention.

As shown in FIG. 12, the illumination controller 25 of the present embodiment is arranged so that the camera synchronizing signal generator 26 responds to the trigger signal from the calling circuit 29 for driving the infrared light emitting diodes 16 in synchronous with the video signal of the television camera 4 until it receives from a handset detector 35 a signal indicative of the handset 5 being hung up of the master station unit 2 after termination of the telecommunication, which is in contrast to the above embodiments 1 and 2 in which the illumination controller 25 is arranged to include the timer 28 for driving the infrared light emitting diodes 16 for the predetermined period of time.

EMBODIMENT 4

Figure 13:
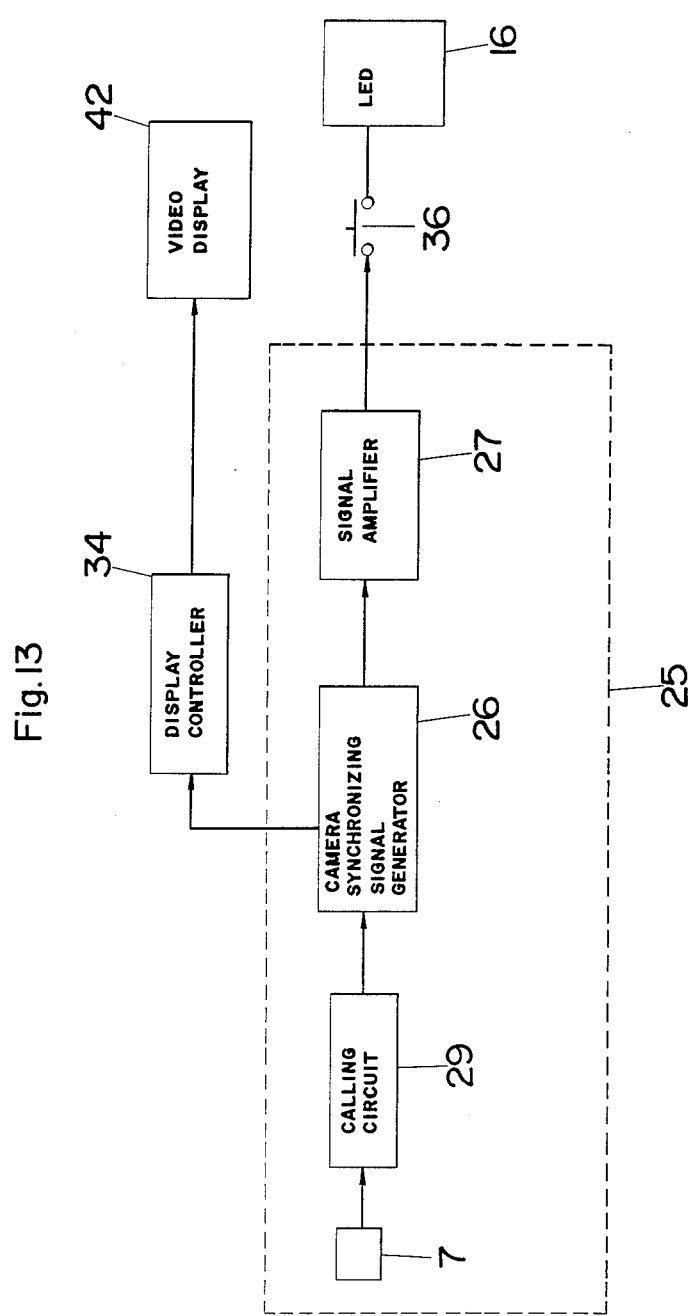
FIG. 13 is a block diagram of an illumination controller employed in a fourth embodiment of the present invention.

As shown in FIG 13, the present embodiment discloses the illumination controller 25 which is similar to that of the previous embodiment in that the camera synchronizing signal generator 26 responds to the output of the calling circuit 29 for producing a synchronizing signal to a display controller 34 which in turn control the television camera 4. But, the infrared light emitting diodes 16 are driven by the amplified signal originating from the camera synchronizing signal generator 26 and are kept producing the light only while an operation switch 36 provided as the illumination operator means on the side of the master station unit 2 is manipulated.

EMBODIMENT 5

Figure 14:
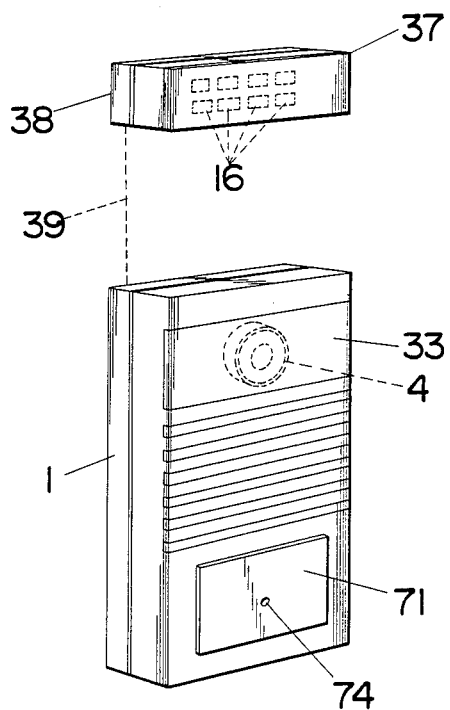
FIG. 14 is a perspective view of a remote station unit and an illumination device employed in a fifth embodiment of the present invention.

As shown in FIG. 14, the present embodiment includes an illumination device 37 which is separately formed from the housing 6 of the remote station unit 1 and incorporates the infrared light emitting diodes 16, the illumination device 37 being electrically and mechanically connected in a detachable manner to a joinder 38 located adjacent to the remote station unit 1, which is in contrast to the previous embodiment 1 in which the infrared light emitting diodes 16 are incorporated within the housing 6 of the remote station unit 1. That is, the present embodiment allows the removal of the illumination device 37 when installing the remote station unit 1 on a site where a street lamp or porch lamp is available for eliminating the requirement of the illumination device. The joinder 38 is connected in circuit with the remote station unit 1 through wires 39 so that the infrared light emitting diodes 16 are supplied with driving voltage therefrom. The illumination controller 25 of the present embodiment may take the form of any one of those disclosed in the previous embodiments 1 to 4.

It should be noted at this time that an automatic exposure control means capable of varying its aperture may be provided in front of the solid state camera 14 in each of the previous embodiments 1 to 5 so as to regulate the amount of incoming light to the solid state camera 14 in proportion to the level of the video signal, enabling the solid state camera 14 to successfully pick up the image even at its minimum illumination level and therefore realizing an improved embodiment.

We claim:

1. An over-door interphone system provided with a night-vision monitoring device comprising:
    a master station unit located inside of a house;
    a remote station unit located outside of an entrance door of the house, said remote station unit being connected to the master station unit for telecommunication between a vistor and a dweller, said remote station unit including
    a housing,
    a television camera mounted within the housing to comprise an optical unit including a solid state camera sensitive to infrared light and optical lens means disposed in front thereof,
    control circuit means mounted adjacent to the optical unit for controlling the optical unit,
    call switch means within the housing for calling the master station unit, and
    telecommunication means within the housing for telephonic intercommunication between the master and remote station units; said
    master station unit including a video display for monitoring an image of the visitor picked up by said television camera;
    an infrared light emitting illumination means located adjacent the remote station unit; and
    an illumination control means for providing a driving output to said infrared light emitting illumination means to actuate the same for producing the infrared light intermittently in synchronism with the operation of said television camera after determining that illuminance of an object image is lower than predetermined level.

2. An over-door interphone system provided with a night-vision monitoring device as set forth in claim 1, wherein said television camera has a viewing range which captures a facial image of the visitor at the remote station unit who is in a position with a hand extending onto a push-button said call switch means provided in a front of the housing of the remote station unit.

3. An over-door interphone system provided with a night-vision monitoring device as set forth in claim 1, wherein said illumination control means producing the infrared light after determining that the illuminance of an object image is lower than a predetermined level based upon an image signal output from the television camera.

4. An over-door interphone system provided with a night-vision monitoring device as set forth in claim 1, wherein said infrared light emitting illumination means is accommodated in the housing of the remote station unit.

5. An over-door interphone system provided with a night-vision monitoring device as set forth in claim 1, wherein said infrared light emitting illumination means is electrically and mechanically connected to the remote station unit through a joinder means.

6. An over-door interphone system according to claim 1 wherein said illumination control means actuating the infrared light emitting illumination means to produce the infrared light for a predetermined time period from the actuation of said call switch means.

7. An over-door interphone system provided with a night-vision monitoring device comprising:
    a master station unit located inside of a house;
    a remote station unit located outside of an entrance door of the house, said remote station unit being connected to the master station unit for telecommunication between a vistior and a dweller, said remote station unit including
    a housing,
    a television camera mounted within the housing to comprise an optical unit including a solid state camera sensitive to infrared light and optical lens means disposed in front thereof,
    control circuit means mounted adjacent to the optical unit for controlling the same,
    call switch means within the housing for calling the master station unit, and
    telecommunication means within the housing for telephonic intercommunication between the master and remote station units;
    said master station unit including a video display for monitoring an image of the visitor picked up by said television camera;
    an infrared light emitting illumination means;
    an illumination operator means mounted on the side of the master station unit for actuating said infrared light emitting illumination means to produce the infrared light upon being operator at the master station unit; and
    an illumination control means for actuation upon pick-up of a handset provided on the master station unit to define said illumination operator means in order to actuate said infrared light emitting illumination means to produce the infrared light intermittently in synchronism with the operation of said television camera for a time period starting from the actuation of said call switch means to a hang-up of said handset.

8. An over-door interphone system provided with a night-vision monitoring device comprising:
a master station unit located inside of a house;
a remote station unit located outside of an entrance door of the house, said remote station unit being connected to the master station unit for telecommunication between a visitor and a dweller,
said remote station unit including
a housing,
a television camera mounted within the housing to comprise an optical unit including a solid state camera sensitive to infrared light and optical lens means disposed in front thereof,
control circuit means mounted adjacent to the optical unit for controlling the optical unit,
call switch means within the housing for calling the master station unit, and
telecommunication means within the housing for telephonic intercommunication between the master and remote station units;
said master station unit including a video display for monitoring an image of the visitor picked up by said television camera;
an infrared light emitting illumination means located adjacent the remote station unit, said infrared light emitting illumination means being composed of a plurality of infrared light emitting diodes which are arranged in series-parallel combination in which the series circuits of the diodes are connected in parallel relation to each other; and
an illumination control means of which output is connected to the parallel circuit of the series connected diodes.

9. An over-door interphone system provided with a night-vision monitoring device as set forth in claim 8, wherein said illumination control means for producing the infrared light after determining that the illuminance of an object image is lower than a predetermined level based upon an image signal output from the television camera.

10. An over-door interphone system provided with a night-vision monitoring device as set forth in claim 8, wherein said infrared light emitting illumination means is accommodated in the housing of the remote station unit.

11. An over-door interphone system provided with a night-vision monitoring device as set forth in claim 8, wherein said infrared light emitting illumination means is electrically and mechanically connected to the remote station unit through a joinder means.

12. An over-door interphone system according to claim 8, wherein said illumination control means actuating the infrared light emitting illumination means to produce the infrared light for a predetermined time period from the actuation of said call switch means.

* * * * *